(12) United States Patent
Axelsson et al.

(10) Patent No.: US 6,493,339 B1
(45) Date of Patent: Dec. 10, 2002

(54) METHOD OF HANDLING A TELEPHONE CALL

(75) Inventors: Fredrik Axelsson, Södertälje (SE); Magnus Hallenstal, Täby (SE); Simon Peel, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/188,361

(22) Filed: Nov. 10, 1998

(30) Foreign Application Priority Data

Nov. 11, 1997 (GB) .............................. 9723803

(51) Int. Cl.[7] .............................................. H04L 12/66
(52) U.S. Cl. ...................... 370/356; 370/389
(58) Field of Search ................................ 370/351, 352, 370/355, 353, 389, 356, 385; 713/201

(56) References Cited

U.S. PATENT DOCUMENTS

| | | | |
|---|---|---|---|
| 5,978,672 A | * 11/1999 | Hartmaier et al. | 455/413 |
| 6,122,255 A | * 9/2000 | Bartholomew et al. | 370/237 |
| 6,125,113 A | * 9/2000 | Farris et al. | 370/389 |
| 6,151,390 A | * 11/2000 | Volftsun et al. | 379/229 |
| 6,208,642 B1 | * 3/2001 | Balachandran et al. | 370/385 |
| 6,292,478 B1 | * 9/2001 | Farris | 370/352 |

FOREIGN PATENT DOCUMENTS

| | | |
|---|---|---|
| WO | 96/38018 | 11/1996 |
| WO | 97/14234 | 4/1997 |
| WO | 97/14238 | 4/1997 |
| WO | 97/16916 | 5/1997 |
| WO | 97/27692 | 7/1997 |
| WO | 97/28628 | 8/1997 |
| WO | 97/29581 | 8/1997 |
| WO | 97/33412 | 9/1997 |
| WO | 97/39560 | 10/1997 |

OTHER PUBLICATIONS

Phone/Fax IP Gateway Applications Guide, "Complete Voice and Fax Integration Over IP Networks", MICOM XP002057738, Jul. 17, 1997.

"Internet Telephony Server", Lucent Technologies, XP000770881, Jul. 17, 1997, pp. 1–5.

* cited by examiner

Primary Examiner—Ricky Ngo
Assistant Examiner—Tri H. Phan
(74) Attorney, Agent, or Firm—Nixon & Vanderhye P.C.

(57) ABSTRACT

A method is disclosed for routing a telephone call over a computer network such as the internet. On determination that the call is to be handled in this way, temporary computer network addresses are allocated to the calling party and called party by their respective local exchanges. The calling party local exchange determines the computer network address of the called party local exchange from a dedicated server.

15 Claims, 4 Drawing Sheets

METHOD OF HANDLING A TELEPHONE CALL

TECHNICAL FIELD OF THE INVENTION

This invention relates to a method of handling a telephone call, and in particular to a method which allows long-distance telephone calls to be routed over the internet, to take advantage of the fact that this may be more cost effective for the telephone subscriber than relying on the normal telephone network.

DESCRIPTION OF RELATED ART

WO96/20553 describes one possible communication system, in which the internet is used for an intermediate leg of a long-distance telephone call. Voice mail or facsimile messages can be sent to a subscriber, and will be stored at a dedicated node in the network, from which they may be retrieved by the subscriber. This document also describes an arrangement whereby one such subscriber may route a long-distance telephone call to another such subscriber, with the internet being used for an intermediate leg of the transmission, between the dedicated access nodes to which the two subscribers are connected.

However, this system requires that each subscriber should be registered with the network of dedicated access nodes, before the internet can be used to route a telephone call between them.

SUMMARY OF THE INVENTION

This invention relates to a method, and to a telephone exchange for use in such a method, which allows a telephone call to be routed over the internet, without requiring any specific registration by either of the subscribers. In preferred embodiments of the invention, when a calling subscriber indicates that he wishes a particular call to be routed over the internet, he is allocated an internet address for the duration of the call. His local telephone exchange determines which local exchange serves the called party, and establishes an internet connection thereto. The local exchange of the called party allocates an internet address to the called party for the duration of the call. This address is returned to the calling party's exchange, thus allowing establishment of a connection over the internet for speech/data transfer between the calling and called parties.

Thus, the call can be routed over the internet without requiring either subscriber to have taken any special steps such as registering with a particular service provider, before the call is placed.

Moreover, the invention allows the call to be routed over the internet while using a desired telephone network protocol such as ISUP. This means that the use of the internet is transparent to the user, there is no feature of the call which appears different from a call which is routed over the normal telephone network. Moreover, the use of a telephone network protocol such as ISUP means that all services supported by ISUP, including IN services if available in the version of ISUP, are available even though the call is routed over the internet.

DETAILED DESCRIPTION OF PREFERRED EMBODIMENT

Figure 1:
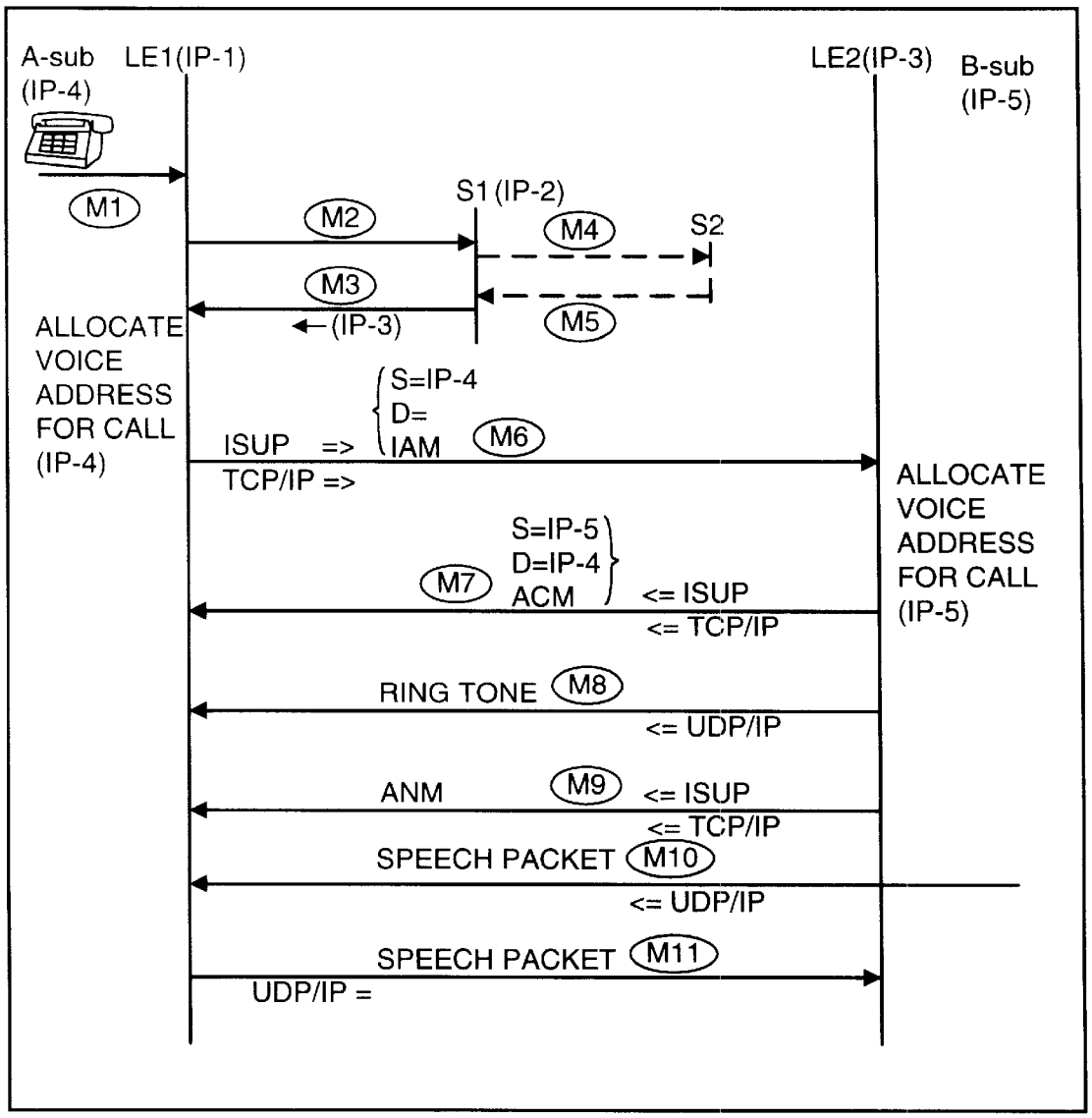
FIG. 1 is a representation of the message flow during a call set up in accordance with the invention.

In the drawings, FIG. 1 illustrates the flow of messages between the local exchanges LE1 and LE2, to which the A-subscriber (that is, the calling party) and the B-subscriber (that is, the called party) are connected, respectively.

Figure 2:
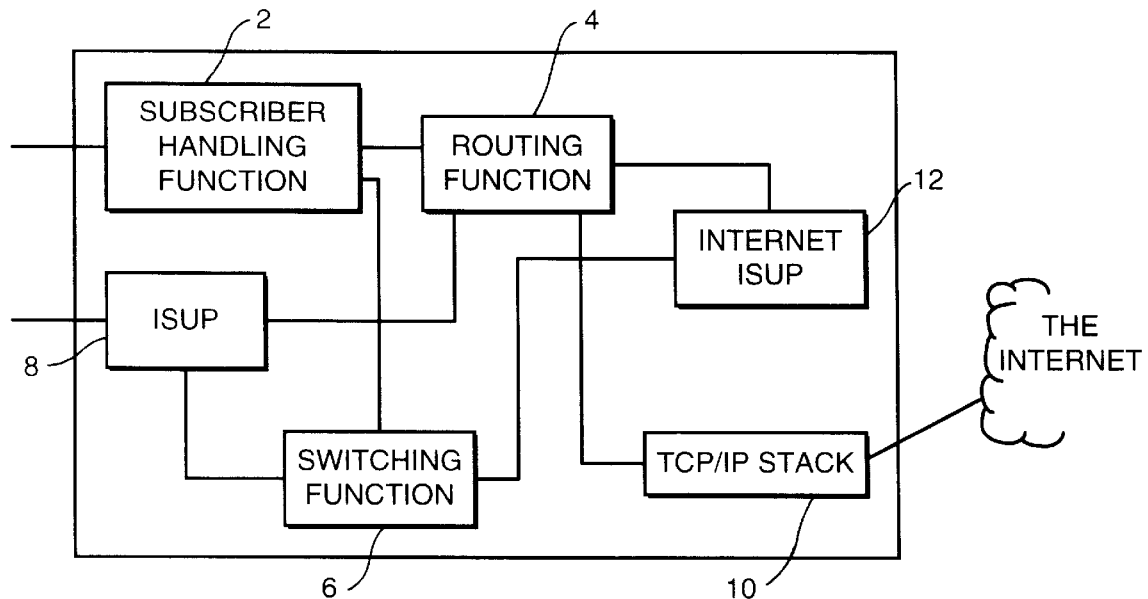
FIG. 2 is a block schematic diagram of the architecture of an exchange in accordance with another aspect of the invention.

The exchanges LE1 and LE2 are conventional AXE exchanges, with modifications as described below with reference to FIGS. 2 and 3. As shown in FIG. 2, each local exchange includes a subscriber handling function 2, to which subscribers are connected, a routing function 4, a switching function 6, an ISUP block 8 which provides connections to the telephone network, a TCP/IP stack 10, and an internet ISUP block 12, which provides connections to the internet. The subscriber handling function 2 and the ISUP block 8 operate as in a conventional exchange. The routing function 4 differs from the corresponding function in a conventional exchange, as will be described in more detail below, while the internet ISUP block 12 is provided specifically to produce the functionality in accordance with the present invention.

The exchanges LE1 and LE2 are advantageously, in each case, the local exchanges to which the respective subscribers are connected, but it will be appreciated that the connection to the internet may be made at any exchange within the communications path. The term "local exchange" is used herein to mean an exchange connected to the internet for handling a call to or from a subscriber. In each case, the local exchange has an internet address, which is used for routing packetised data between the exchanges. As is well known, the exchanges include hardware (HW) blocks, and blocks implemented in software (SW).

Figure 3:
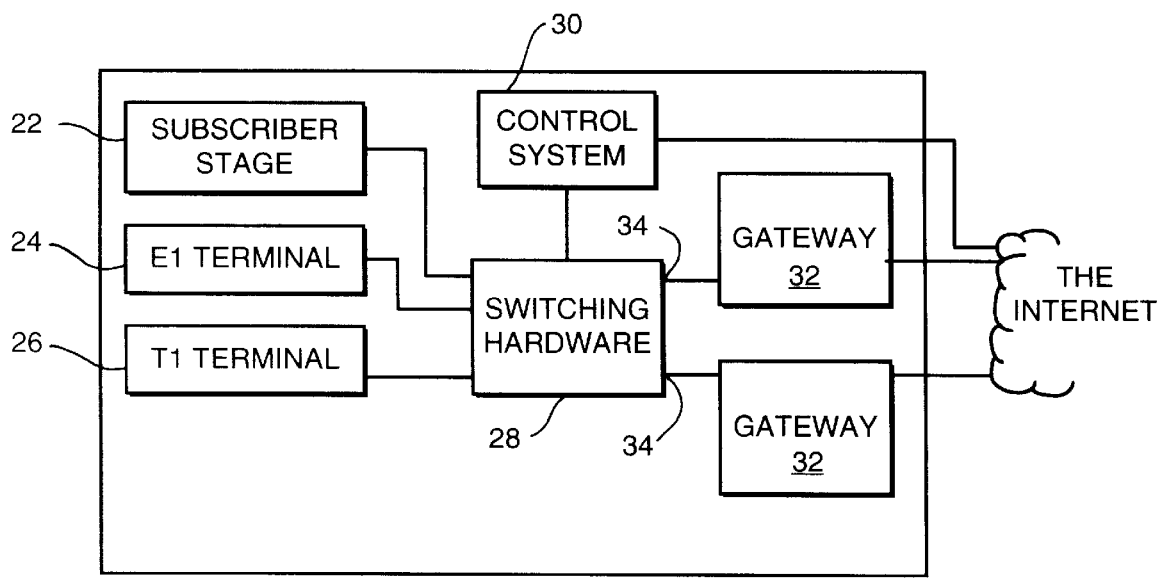
FIG. 3 is a block schematic diagram of the hardware of an exchange in accordance with the other aspect of the invention.

FIG. 3 is a schematic representation of the hardware within an exchange. The details thereof are well known to the person skilled in the art. The exchange includes a subscriber stage 22, E1 (that is, a 30B+D 2048 kbit/s PCM link) terminal 24, T1 (that is, a 23B+D 1544 kbit/s PCM link) terminal 26, switching hardware 28, computer-based control system 30, and a plurality of gateways 32, with switch inlets 34, which provide connections to the internet, for example.

To originate the call, the A-subscriber dials the number of the B-subscriber (the B-number). This is shown as message M1 in FIG. 1. To indicate that the call is to be routed through the internet, the A-subscriber, for example, adds a prefix before dialling the B-number. As an alternative, the operator may have set a default value that all calls from this A-subscriber (or all international calls or all long-distance calls, or some other subset of calls) are to be routed via the internet.

In either case, the number dialled by the A-subscriber is analysed in the routing function 4 of the local exchange LE1. If it is determined that the call is to be routed via the internet, it is necessary to determine the internet address to which the transmission must be sent. This should be the internet address of the exchange, able to handle such messages, closest to the called party. In addition, in accordance with the invention, internet addresses must be allocated to the A-subscriber and the B-subscriber. The purpose of these addresses is two-fold. Firstly, they identify the call to which a specific ISUP message, received on the internet connection between exchanges, relates. Secondly, they identify the physical port connection of the call at the exchange to/from which speech or data packets should be sent/received between the A- and B-subscribers. In accordance with the invention, these addresses are allocated for the duration of one particular call only, from a pool of addresses available for allocation by the local exchange to which the respective subscriber is connected.

Thus, once the routing function 4 determines that the call is to be routed via the internet, it sends a message to the internet ISUP block 10.

The internet ISUP block 10 then allocates to the A-subscriber, for the duration of the call, a particular internet address (IP-4) and a switching inlet position.

Moreover, the routing function 4 controls the determination of the internet address of the B-subscriber's local exchange.

Preferably, the routing function 4 carries out database queries to find out that address. Specifically, in order to allow the exchange LE1 to determine the internet address of the local exchange to which the B-subscriber is connected, there is a network of servers, examples of which are server S1 and server S2 in FIG. 1. Each such server may, for example, store the internet addresses of all of the local exchanges in one country or region, while each local exchange stores the internet address of its closest server. Thus, in the FIG. 1 example, the local exchange LE1 sends an enquiry M2 to its local server S1, which has an internet address IP-2. Enquiries from local exchanges to their respective servers might preferably be sent using a protocol based on the Domain Server Message protocol used in DNS, and for this purpose appropriate software is provided in the routing function of each local exchange. In general, the network of servers is hierarchical, and may advantageously be based on the E.164 telephone numbering plan.

Thus, the B-number is sent to the server S1 over the internet. The server S1 returns the required internet address IP-3 of the local exchange in message M3 of the FIG. 1. In the event that the required internet address is not known to the server S1, for example because the two subscribers are located in different countries, the server S1 is able to send a message M4 to a further server S2, which is then able to return the required address to the server S1 in a message M5.

It should be noted that, as an alternative to this procedure, the internet address of the closest exchange to the called subscriber might alternatively be found using normal routing techniques. In that case, the routing function 4 has an address to which it sends all messages to be routed through the internet.

Once the internet address IP-3 of the local exchange LE2 has been determined, then, within the local exchange LE1, it is returned to the internet ISUP block 12, which initiates establishment of a TCP/IP connection between the two exchanges, over which modified ISUP messages can be sent, allowing the A-side local exchange LE1 to set up the call as described below.

An alternative to establishing the TCP/IP connection between exchanges on a per call basis is that, at configuration of the exchanges, a signalling route is defined. At definition of the route, a TCP/IP connection is established. Local exchange LE1 would then use the internet address IP-3 to find the established TCP/IP connection over which the call set up should take place.

The A-side exchange LE1 allocates an internet address (IP-4) for the call. This address is used by the internet ISUP block 12 to identify the call to which a specific ISUP message, received on the TCP/IP connection between exchanges, relates. The local exchange LE1 then sends an IAM message M6 over the TCP/IP connection using a modified ISUP format.

Figure 4:
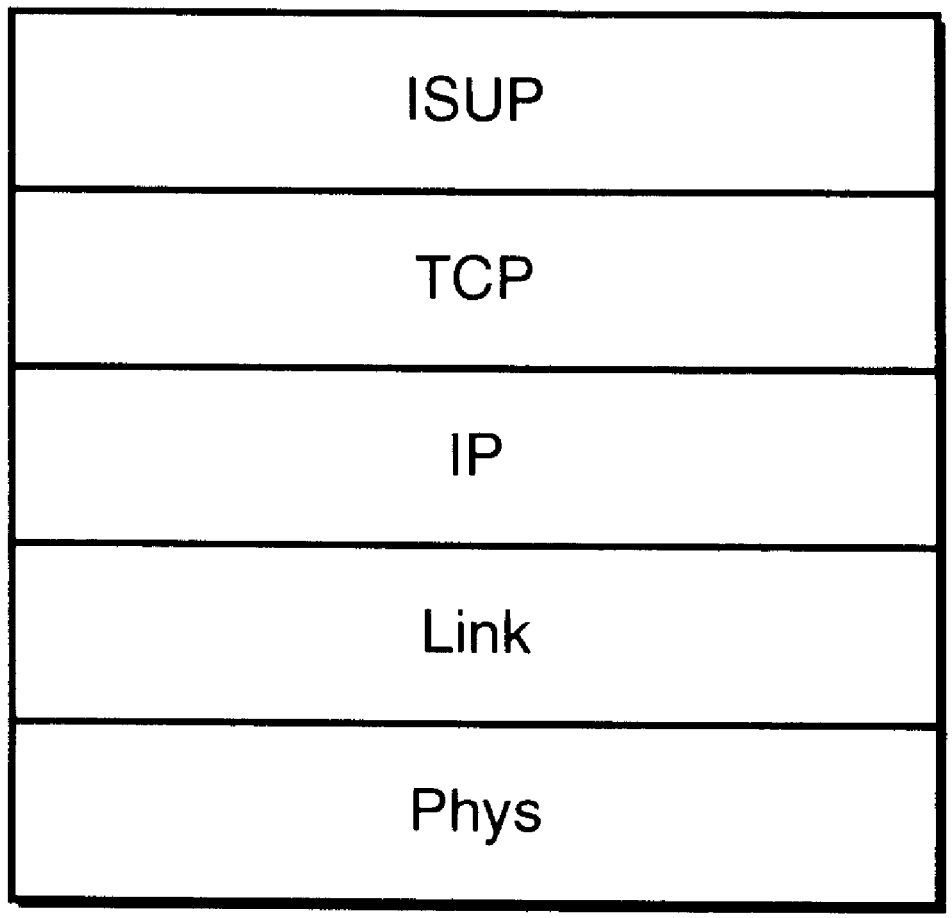
FIG. 4 represents the signalling protocol used in accordance with the invention.
Figure 5:
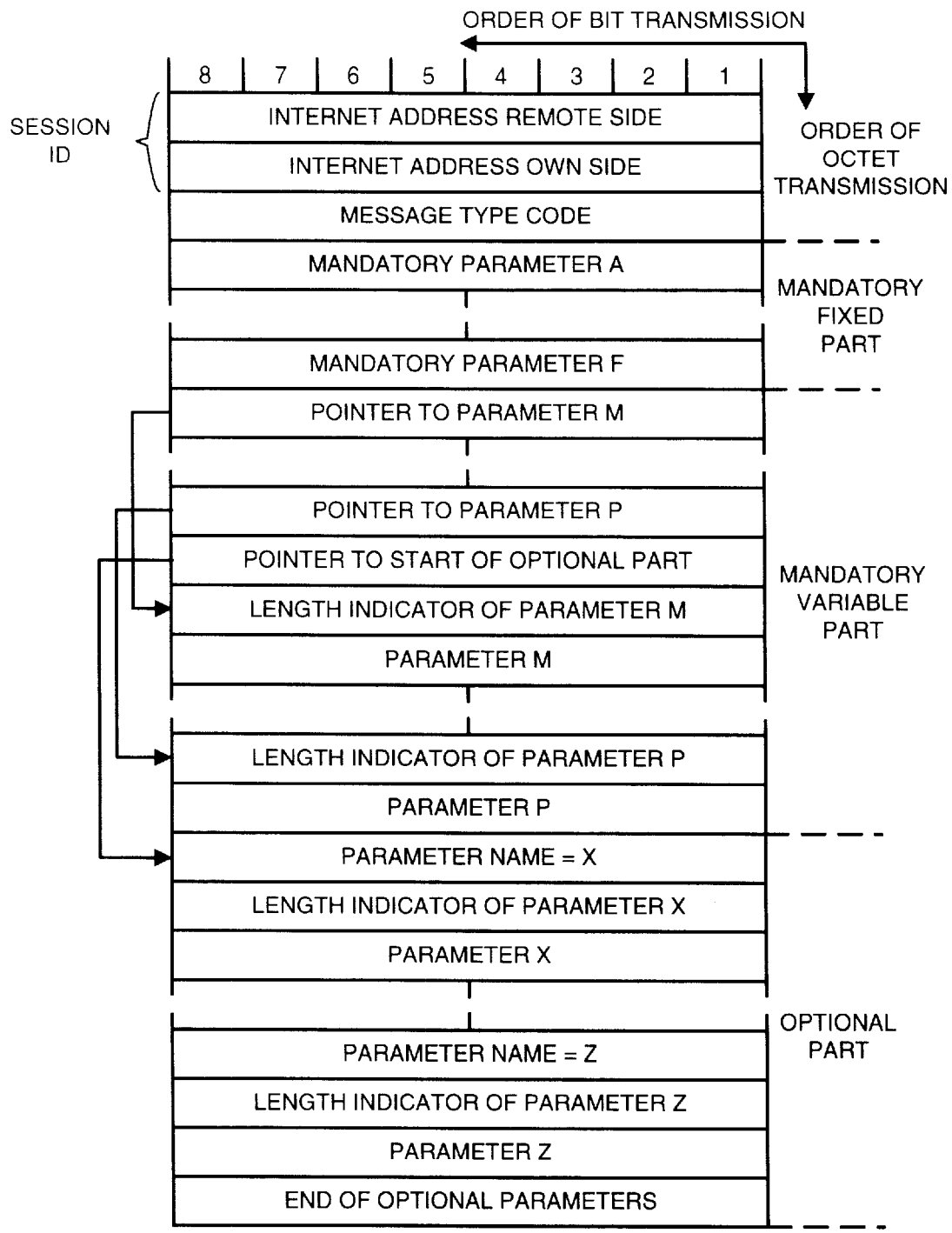
FIG. 5 is a more detailed representation of a part of the signalling protocol structure shown in FIG. 4.

FIGS. 4 and 5 show in more detail the way in which ISUP messages are transmitted in preferred embodiments of the invention. FIG. 4 shows the signalling protocol/stack, and FIG. 5 shows the structure of the internet ISUP message.

Regarding FIG. 5, the internet ISUP format is closely based on the ISUP format specified in the ITU-T specification Q.763. However, the conventional "routing label" and "circuit identification code" are replaced in preferred embodiments of the invention by addresses, which, as described previously, indicate to which call the message relates and to (or from) which physical port the speech packets for the call should be sent (or received), namely the "internet address remote side" and the "internet address own side".

These internet addresses may take one of at least three different forms.

Firstly, the voice addresses may simply be IP-addresses. Thus, the exchange has a pool of IP-addresses, and each IP-address is the address for one call. Hence, each speech path into the switching hardware 28 (FIG. 3) maps onto one particular IP-address allocated to that call.

Secondly, the internet addresses may use UDP-ports and IP-addresses. In this case, the IP-address identifies a particular gateway 32 (FIG. 3), and each speech path into the switching hardware 28 (FIG. 3) maps onto one particular UDP port for one gateway.

Thirdly, a pool of local IP-addresses can be used, with tunnelling between the exchanges. That is, the IP-address for the exchange can be used to tunnel the other local IP-addresses through. For example, when a packet reaches an exchange, it is addressed to the address of the exchange, but the tunnelling allows the exchange to look into the packet to find a local IP-address transmitted therewith, and the packet can then be transmitted to a gateway, and be assigned to the relevant call to which it corresponds.

Finally, with regard to the format of the internet ISUP message, it is preferred that this should not include any maintenance messages such as blocking, deblocking, etc.

In more detail, in the case where UDP ports are used, the ISUP internet block 12 is able to identify a gateway 32 (FIG. 3) with at least one free port. The switch port and UDP port mapping are transmitted to the gateway 32, and the identity of the switch port is transmitted to the switching function 6 (FIG. 2), which orders the connection through the switching hardware 28 (FIG. 3) when the two ports have been identified.

The IAM message (which at this stage excludes the "internet address remote side", which has not yet been allocated) is received in the local exchange LE2, to which the B-subscriber is connected. This exchange is able to recognise that the received message relates to a telephone call sent over the internet, and this is indicated to the TCP/IP stack 10, which routes the IAM message to the internet ISUP block 10.

As previously described with reference to the A-side local exchange LE1, the B-side local exchange LE2 has a pool of internet addresses available for allocation on a per call basis. Thus, in messages B2, internet ISUP block 10 fetches an internet address for the call from the pool. As in the A-side local exchange LE1, the internet ISUP block 10 stores a file of internet addresses, each having a respective switch inlet for transmissions.

Within the B-side local exchange LE2, the IAM message is used to seize the routing function.

Within the routing function, the B-number is analysed, and a message confirms that the required switching path has been reserved. Messages then inform the gateway of the A-side internet address IP-4 which is to act as the destination address for transmissions from the B-subscriber to the A-subscriber, and the allocated sending address IP-5. This address IP-5 is the other part of the session ID mentioned earlier. The B-side local exchange LE2 then sends an acknowledge message ACM (message M7 in FIG. 1 and a ringing tone (M8 in FIG. 1) to the A-subscriber. The ACM message is sent when the internet ISUP block 12 receives a confirmation message from the routing function 4, and is sent over the established TCP/IP connection as discussed above. The ringing tone is compressed in the gateway, and is sent to the A-subscriber using UDP packets.

Within the A-side local exchange LE1, the ACM message received from the B-side local exchange is received and the B-subscriber internet address IP-5, which is to be used as the destination address for transmissions from the A-side, is noted. In message M7, this address is passed down to the gateway, so that UDP packets received in the gateway can be associated with the correct switch inlet, as discussed above. In addition, in message M8, the ACM message is passed to the routing function 4, and the switch inlet is sent to the switching function 6, to operate the reserved speech paths.

The UDP packets representing the ringing tone, received at the A-side local exchange LE1, are now decompressed in the gateway, and sent to the A-subscriber.

The physical path between the subscribers is now established. When the B-subscriber answers, an appropriate message ANM (M9 in FIG. 1) is sent from the B-side local exchange LE2 to the A-side local exchange LE1. Speech packets M10, M11 can now be sent between the subscribers, using the respective temporarily allocated addresses IP-4 and IP-5 as destination addresses.

There is thus provided a method, and a modified exchange which allows telephone calls to be routed over the internet, thus allowing subscribers to gain the benefit of cheaper long-distance telephone calls.

Moreover, the fact that the internet is used to route the call is not apparent to the user, and all conventionally available services supported by the user's exchange can be supported for calls routed over the internet.

Of course, it will be appreciated that, although the invention has been described herein with reference to the transmission of telephone calls over the internet, this is merely one example of a computer network, and the invention is generally applicable to all such networks.

What is claimed is:

1. A method of routing a telephone call from a first telephone subscriber to a second telephone subscriber over a computer network, the method comprising allocating computer network addresses to a plurality of exchanges in a telecommunications network that are connected to said computer network, each exchange being connected to a plurality of subscribers either directly or indirectly via other exchanges, the method further comprising:

determining a first exchange, connected to the computer network and connected directly or indirectly to the first subscriber, that the call is to be routed over the computer network;

sending a message (M2) from the first exchange to an analysis device;

in the analysis device, determining the computer network address of a second remote exchange connected to the computer network, that is directly or indirectly connected to the second subscriber;

sending a message (M6) to the second exchange;

in the first and second exchanges, allocating temporary computer network addresses to the first and second subscribers respectively for the duration of the call, said temporary computer network addresses being allocated from a pool of computer network addresses available for such allocation;

notifying the first exchange of the temporary computer network address allocated to the second subscriber; and routing the telephone call over the computer network between the first and second exchanges using said allocated temporary computer network addresses.

2. A method as claimed in claim 1, comprising:

transmitting messages between the first and second exchanges using ISUP protocol with a modified ISUP message format containing the first and second temporary computer network addresses in order to establish the call.

3. A method as claimed in claim 1, wherein the temporary computer network address allocated to each party is selected from a respective pool of addresses allocated to the respective exchange.

4. A method as claimed in claim 1, wherein the temporary computer network address allocated to each party identifies a gateway within the respective exchange connected to the computer network, and a UDP port address within the gateway selected for the call.

5. A method as claimed in claim 1, in which the computer network is the internet, and the addresses are IP-addresses.

6. A method as claimed in claim 2, in which each allocated temporary computer network address is used within the respective exchange (1) to identify the call to which the modified ISUP messages relates at the respective exchange and (2) to identify a physical port at a computer network interface of the respective exchange to allow transfer of speech or data packets between the two parties.

7. A method as claimed in claim 2, wherein a message in the modified ISUP message format includes a session ID comprising the addresses allocated to the two parties.

8. A method as claimed in claim 1, wherein the analysis device is a dedicated server.

9. A method as claimed in claim 8, wherein the telecommunications network includes a plurality of dedicated servers, each being able to determine the computer network address of a plurality of exchanges, and each comprising means for redirecting a message, relating to an exchange whose computer network address the server is unable to determine, to an appropriate server.

10. A method as claimed in claim 8, wherein the telecommunications network includes a plurality of dedicated servers, each being able to determine the computer network address of a plurality of exchanges, and each comprising means for redirecting a message relating to an exchange whose computer network address the server is unable to determine, to an appropriate server.

11. A telecommunications exchange, for routing a telephone call from a first telephone subscriber to a second telephone subscriber over a computer network, the exchange being able to be connected to a plurality of subscribers either directly or indirectly via other exchanges, the telecommunications exchange comprising:

means for determining that a call, received from a first subscriber connected directly or indirectly thereto, is to be routed over the computer network to a second subscriber;

means for sending a message to an analysis device;

means for noting the computer network address of a second remote exchange connected to the computer network, that is directly or indirectly connected to the second subscriber;

means for sending a message to the second exchange;

means for allocating a temporary computer network address to the first subscriber for the duration of the call, said temporary computer network address being allocated from a pool of computer network addresses available for such allocation;

means for noting a temporary computer network address allocated at the second exchange to the second subscriber; and means for routing the telephone call over the computer network from the first exchange to the second exchange using said allocated temporary computer network addresses.

12. An exchange as claimed in claim 11, further comprising means for exchanging messages with the second exchange using ISUP protocol with a modified ISUP message format containing the first and second temporary computer network addresses in order to establish the call.

13. An exchange as claimed in claim 11, further comprising means for selecting the temporary computer network address from a pool of addresses allocated to the exchange.

14. An exchange as claimed in claim 11, wherein the temporary computer network address allocated to each party identifies a gateway within the exchange, and a UDP port address within the gateway selected for the call.

15. An exchange as claimed in claim 12, further comprising means for using the allocated temporary computer network address(es) to identify the call to which the modified ISUP message(s) relate(s) at the respective exchange and to identify a physical port at a computer network interface of the respective exchange to allow transfer of speech or data packets between the two parties.

* * * * *